United States Patent
Angus (10) Patent No.: US 10,389,605 B2
(45) Date of Patent: Aug. 20, 2019

(54) AREA BASED EVENT DETECTION AND MULTI-FACTORIAL EVENT CHARACTERIZATION

(71) Applicant: NCR Corporation, Duluth, GA (US)

(72) Inventor: Robin Angus, Scotland (GB)

(73) Assignee: NCR Corporation, Atlanta, GA (US)

( * ) Notice: Subject to any disclaimer, the term of this patent is extended or adjusted under 35 U.S.C. 154(b) by 273 days.

(21) Appl. No.: 14/865,671

(22) Filed: Sep. 25, 2015

(65) Prior Publication Data

US 2017/0093657 A1    Mar. 30, 2017

(51) Int. Cl.
*H04L 12/26* (2006.01)
*H04W 24/08* (2009.01)
*H04W 4/021* (2018.01)

(52) U.S. Cl.
CPC ............ *H04L 43/065* (2013.01); *H04L 43/16* (2013.01); *H04W 4/021* (2013.01); *H04W 24/08* (2013.01)

(58) Field of Classification Search
CPC ................................ H04L 43/16; H04W 4/021
USPC ........................................................ 370/252
See application file for complete search history.

(56) References Cited

U.S. PATENT DOCUMENTS

| | | | | |
|---|---|---|---|---|
| 8,063,766 B2* | 11/2011 | Daly | .................... | G08B 27/005 340/531 |
| 8,225,988 B1* | 7/2012 | Bohen | .................. | G06Q 10/087 235/379 |
| 2008/0148383 A1* | 6/2008 | Pitchaikani | ............. | H04L 67/20 726/12 |
| 2008/0313037 A1* | 12/2008 | Root | ...................... | G06Q 30/02 705/14.53 |
| 2012/0218127 A1* | 8/2012 | Kroen | .................. | G08G 5/0034 340/945 |
| 2013/0332571 A1* | 12/2013 | Hoshing | ................ | G06Q 10/06 709/217 |
| 2014/0031068 A1* | 1/2014 | Yamada | ................. | G06Q 30/02 455/456.3 |
| 2014/0278573 A1* | 9/2014 | Cook | ..................... | G06Q 40/08 705/4 |

* cited by examiner

*Primary Examiner* — Robert M Morlan
*Assistant Examiner* — Pamit Kaur
(74) *Attorney, Agent, or Firm* — Schwegman, Lundberg & Woessner (57) ABSTRACT

Embodiments of a system and method for an area based event detection and multi-factorial event characterization are generally described herein. A method may include identifying a cell, the cell including a plurality of endpoint devices, receiving information relevant to the cell, and comparing the received information, using a metric, to historical data corresponding to the cell. The method may include generating a cell alert when comparing the received information to the historical data identifies an outlier, and storing the cell alert and the received information.

20 Claims, 6 Drawing Sheets

AREA BASED EVENT DETECTION AND MULTI-FACTORIAL EVENT CHARACTERIZATION

BACKGROUND

Device monitoring tools, cash management, and transaction management tools typically focus on managing individual endpoints, such as a Self-Service Terminal (SST). These tools cannot determine, evaluate, monitor, or track trends that affect multiple endpoints. Current systems also fail to consider external events that affect individual endpoints. Some systems require human input to manage individual endpoints.

Device monitoring tools provide information based on a real time machine data feed at the micro level of an individual endpoint. However, these tools fail to provide or consider real world factors outside of the machine data feed of the individual endpoint. The device monitoring tools are reliant on data originating from the endpoint itself.

SUMMARY

In various embodiments, methods and systems for monitoring endpoint devices and area based events are presented.

According to an embodiment, a method may include identifying a cell, the cell including a plurality of endpoint devices, receiving information relevant to the cell, comparing the received information, using a metric, to historical data corresponding to the cell, generating a cell alert when comparing the received information to the historical data identifies an outlier, and storing the cell alert and the received information.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Device and monitoring and management tools typically focus on endpoint devices. However, an operations team may be periodically faced with external issues that impact network performance across one or more devices in a network. An effective response to the issues may inform an operations analyst so that the operations analyst may understand that a group of events or issues being monitored by the system are related. Another response to the issues and events may include an automatic response, such as sending a message to a remote device and causing the message to be displayed on the remote device. The context of an event and the root cause of an issue or event may be used to resolve the issue.

Figure 1:
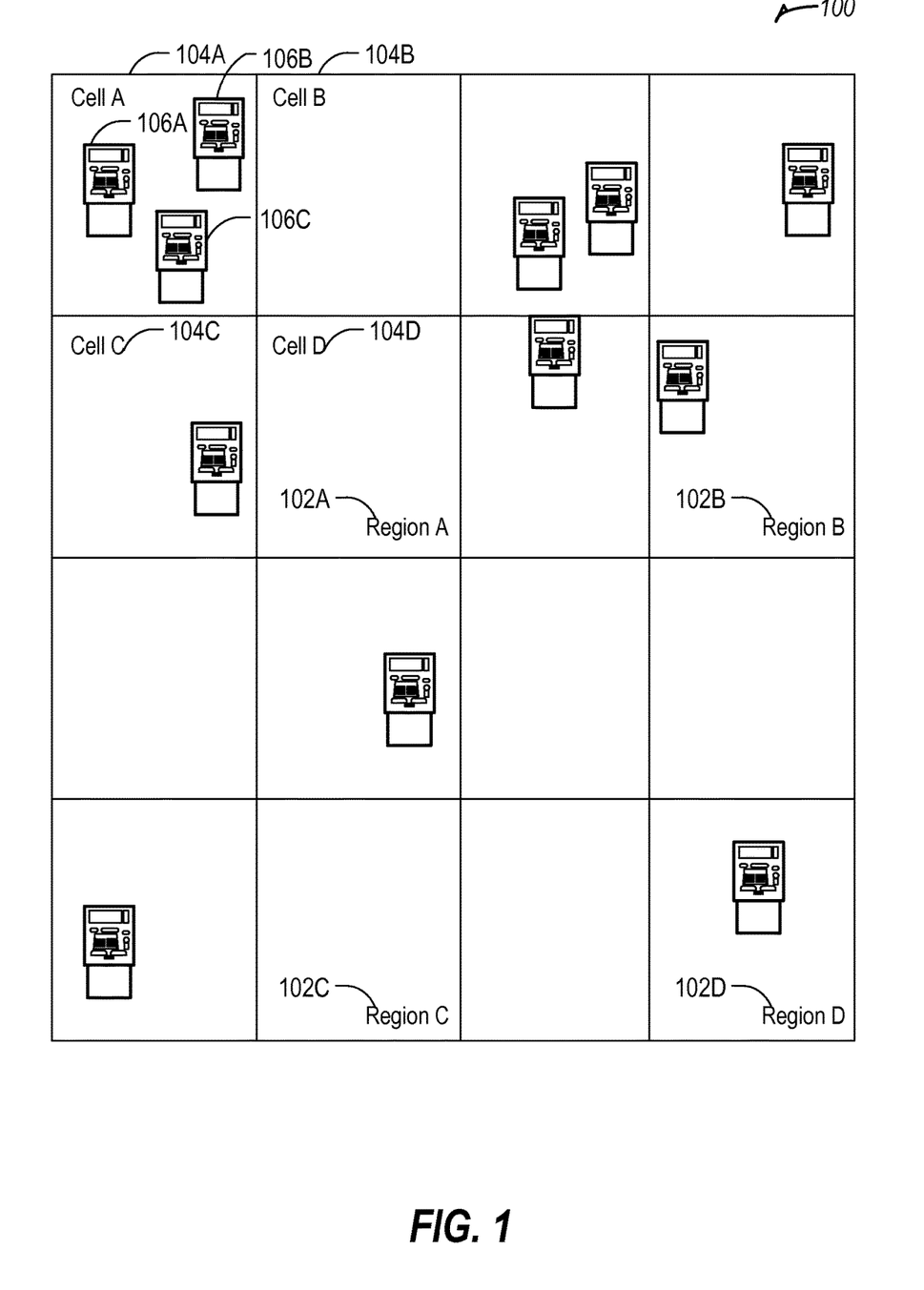
FIG. 1 illustrates generally a network grid showing endpoints in accordance with some embodiments.

FIG. 1 illustrates generally a network grid 100 showing endpoints (e.g., 106A-106C) in accordance with some embodiments. The network grid 100 is subdivided into regions (e.g. Regions A-D 102A-102D) and the regions are subdivided into cells (e.g., Cells A-D 104A-104D). In the example shown in FIG. 1, a rectangular grid that is evenly divided is shown, but other shapes or types of divisions may be substituted. For example, a region or a cell may be defined by a number of endpoints rather than physical area. The various cells may have differing numbers of endpoints and the regions may have differing numbers of cells. In another example, a cell may include the entirety of a region. In yet another example, a cell or a region may be user defined.

FIG. 1 shows a limited number of endpoints for illustrative purposes. A cell may include, for example, 10-50 endpoints. An endpoint includes a Self-Service Terminal (SST), such as an Automated Teller Machine (ATM), self-service checkout terminal, or other cash-dispensing machine. Cells and regions may be dynamic and change according to user input, or event or data driven inputs. For example, a road closure may be used to rearrange cells if traffic to one or more endpoints is changed.

The network grid 100 may be used to monitor the various endpoints and help ensure successful operation. For example, the network grid 100 may be used by an automated system, an operations analyst driven system, or a combined system to monitor and adjust endpoint activity. In the example shown in FIG. 1, network grid 100 includes a cell A 104A with three endpoints 106A-106C. Once cell A 104A is defined to include the three endpoints 106A-106C, a system may use a geographic area of cell A 104A to define a relevant geographic area. The system may receive information related to the relevant geographic area, as described below. The system may use the received information to identify the affected endpoint or endpoints (e.g., one or more of 106A-106C).

In an example, an operations analyst may be assigned to monitor and adjust endpoints in a cell, such as cell A 104A. In this example, the operations analyst may control only endpoints in the assigned cell A 104A. In other examples, the operations analyst may control endpoints in cell A 104A and surrounding cells (e.g., cell B 104B and cell C 104C) or in all cells in a region (e.g. region A 102A) or all endpoints.

Figure 2:
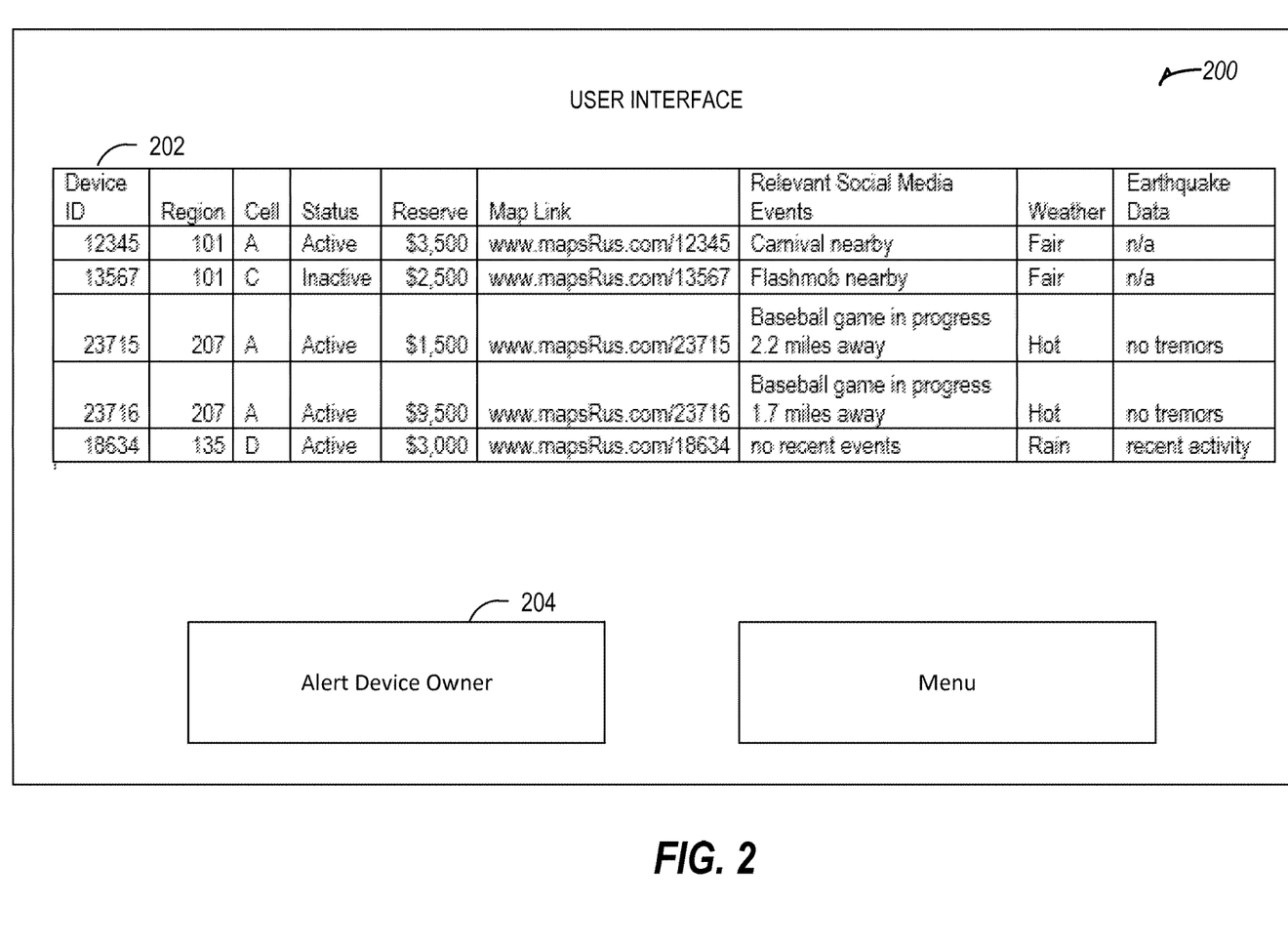
FIG. 2 illustrates generally an endpoint management user interface in accordance with some embodiments.

FIG. 2 illustrates generally an endpoint management user interface 200 in accordance with some embodiments. The user interface 200 may display a variety of different views, such as a view of the network grid 100 or a cell from FIG. 1. The user interface 200 as shown in FIG. 2 includes a menu, option to alert device owner 204 and a device listing 202. The device listing 202 may include a list of one or more of the endpoint devices in a system (e.g., all endpoints in a cell, all endpoints in a region, a single endpoint, etc.). In another example, the device listing 202 may include devices with a current or pending alert. In yet another example, the endpoints listed in the Device ID column of the device listing 202 may include an endpoint that has an alert and all other endpoints that share a cell.

The device listing 202 may include multiple columns of received information, such as a device ID, region, cell, status, cash reserve status, a link to a map of the endpoint (or cell), accumulated relevant social media events, weather, or earthquake data. The columns may be rearranged, removed if they have no relevant information, or expanded. In another example, other columns may be added, showing additional information such as a link to a video feed (live or recorded) of the endpoint, links to news stories, or links to relevant social media feeds or websites.

Historical data may also be shown on the user interface 200. For example, historical data showing typical cash reserves for an endpoint at various times, dates, days, months, or years may be shown. The historical data may include past similar relevant social media events along with cash reserve data from those events. In another example, graphs, tables, or other information may be displayed on the user interface to portray trends (historical or present) of various endpoint characteristics, such as cash reserves, likelihood of malfunction, maintenance services, or the like. Other information that may be displayed includes endpoint location identifying information, social media information geographically relevant to an endpoint or cell, earthquake information geographically relevant to an endpoint or cell, weather information geographically relevant to an endpoint or cell, cash dispense volume at an endpoint or cell, failed customer interactions for an endpoint or cell, servicer service level agreement (SLA) compliance at an endpoint or cell, device security status (e.g., status changes or issues), technical issues (e.g., malfunctions), or service visits to an endpoint or cell.

The user interface 200 may include an option to alert device owner 204. The alert device owner 204 option may alert an endpoint device owner, operator, supplier, servicer, filler, etc., or may include multiple options to alert more than one of those entities. The alert device owner 204 option may allow a user to transmit an alert and information relating to an endpoint, multiple endpoints, a cell, etc. For example, a user may select the alert device owner 204 option to transmit an alert regarding endpoint devices 23715 and 23716 that a baseball game is in progress nearby. The transmission may include additional information, such as an indication that endpoint device 23715 has low cash reserves and that endpoint device 23716 has higher reserves, enabling a servicer to transfer cash from 23716 to 23715. The alert may be transmitted automatically without user input by a system if a predefined situation occurs or a threshold is met.

Figure 3:
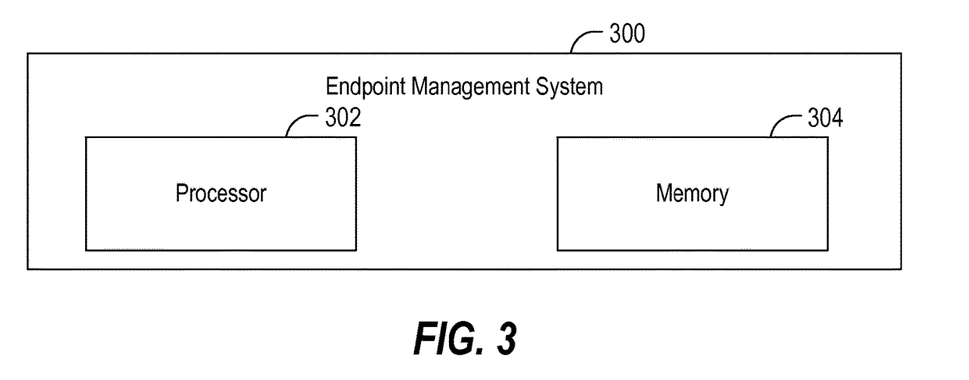
FIG. 3 illustrates generally an endpoint management system in accordance with some embodiments.

FIG. 3 illustrates generally an endpoint management system 300 in accordance with some embodiments. The endpoint management system 300 includes a processor 302 and memory 204. Memory 304 may include short term memory, long term memory, a database, a plurality of databases, etc. The processor 302 may include a single processor, a plurality of processors used in combination, such as in sequence or parallel.

The processor 302 may include one or more processors and may be coupled to the memory, including a memory device. The memory device may contain instructions that, when executed by the one or more processors, cause the system to perform operations. The operations may include identifying a cell, the cell including a plurality of endpoint devices, receiving information geographically relevant to the cell, compare the received information, using a metric, to historical data corresponding to the cell, generate an alert when comparing the received information to the historical data identifies an outlier, or causing the alert and at least part of the received information to be stored in a database. The system 300 may display, present, or transmit the alert. In an example, the system 300 may display, present, or transmit the received information, a part of the received information, additional information, the historical data, trends, graphs, figures, or the like.

The system 300 may use various metrics, such as a cash dispense volume, failed customer interactions, servicer service level agreement (SLA) compliance, device security status, technical issues, or service visits. The system 300 may compare the received information to historical data using an average or median of a metric, a threshold value for a metric, or the like. The values used for the metric may be based on the historical data or selected by a user. The system 300 may compare the received information to historical data for a single endpoint, multiple endpoints, all endpoints in a cell or region, or combinations of endpoints. The received information may include endpoint location identifying information, social media information, earthquake information, or weather information.

Figure 4:
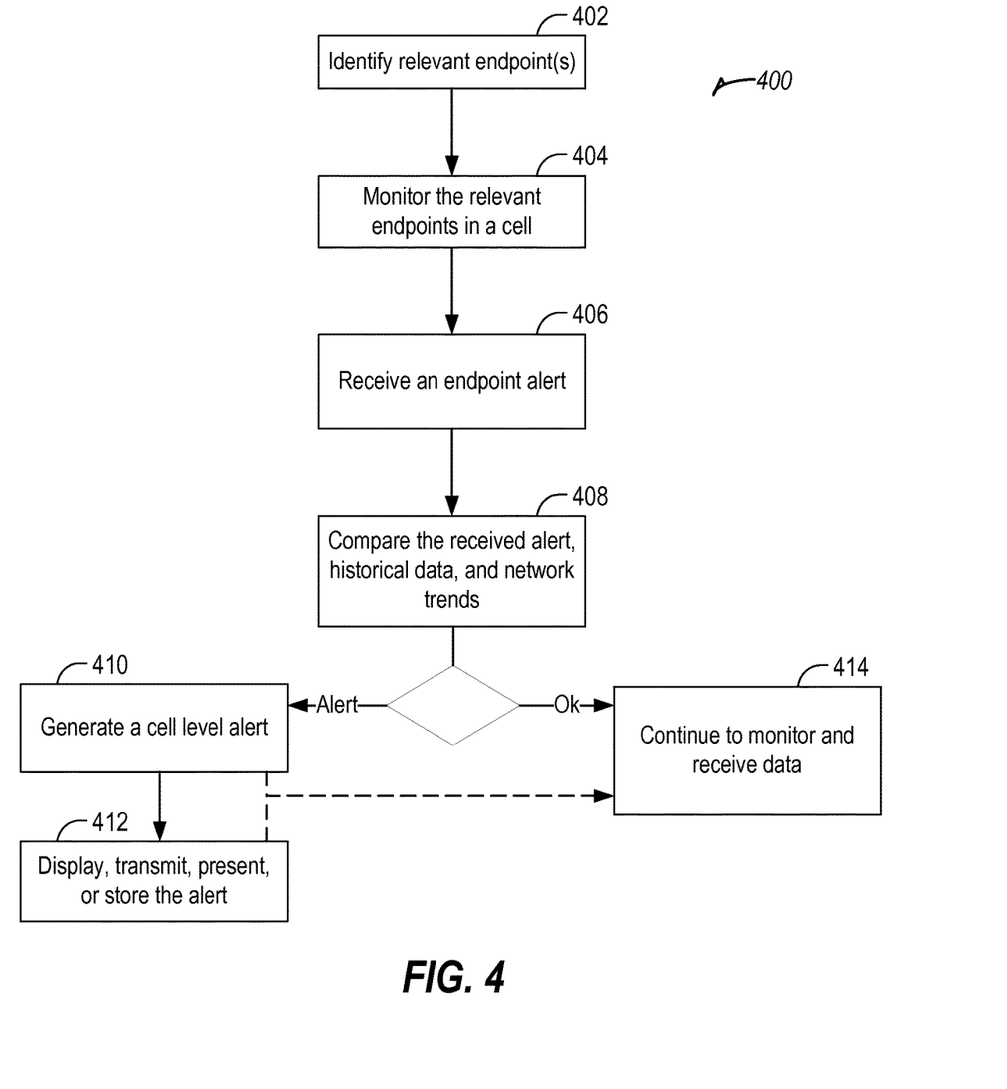
FIG. 4 illustrates generally a flowchart showing a technique for monitoring endpoints in accordance with some embodiments.

FIG. 4 illustrates generally a flowchart showing a technique 400 for monitoring endpoints in accordance with some embodiments. The technique 400 includes an operation 402 to identify relevant endpoints. In an example, an endpoint includes a SST, such as an ATM or self-service terminal. Operation 402 may include identifying a relevant endpoint or a plurality of relevant endpoints. For example, operation 402 includes identifying a cell including a plurality of endpoints. In an example, operation 402 may be done automatically, such as by an algorithm to determine cells with a specified number of endpoints or an approximate number of endpoints, using endpoint location information, map data, traffic or pedestrian flow information, historical data, etc. In another example, operation 402 may include receiving a selection of a set of relevant endpoints from a user, such as on a map on a user interface, by endpoint device identification, or the like.

The technique 400 includes an operation 404 to monitor the relevant endpoints in a cell. For example, for each cell including a set of endpoints identified in operation 402, the technique 400 may include monitoring the set of endpoints and determining what information to receive. The information determined to be received may include user selected information, automatically selected information, a combination of those two, all available information, etc. The information determined to be received may differ for different endpoints in a cell or in multiple cells, may be uniform across a cell or region, or may be unique to each cell or endpoint. After the information determined to be received is processed, the technique 400 includes receiving the information determined to be received. For example, the technique 400 may include operations to receive social media data, earthquake data, weather data, video data, map data (e.g. road layouts, vehicle traffic, bike traffic, pedestrian traffic, train data, plane data, etc, or endpoint location data), local news data, satellite data, pictures, webcams, or any other additional data that may be determined in operation 404. In another example, the operation to receive additional data may include data pushed without being determined to be received in operation 404. For example, to receive additional data, the operation to receive additional data may include receiving information from a separate technique determined by the separate technique to be relevant to an endpoint. Receiving this additional data may include querying the separate technique at operation 404 for all relevant information, and receiving the additional data as part of the relevant information.

The technique 400 includes an operation 406 to receive an endpoint alert. The endpoint alert may include an alert corresponding to the received data described above, or may be a separate alert generated by the endpoint itself. The endpoint generated alerts may include a cash depletion alert, a malfunctioning alert, etc.

The technique 400 includes an operation 408 to compare the received data, historical data for a cell, endpoint, or combination of endpoints or cells, and network trends to determine if a cell alert should be generated. The cell alert may include an alert based on physical circumstances of a plurality of endpoints, such as alerts from the plurality of endpoints (e.g., cash depletion at the plurality of endpoints). In an example, operation 408 may disregard certain received information, such as information that lacks sufficient historical data. In another example, operation 408 may compare individual types of received data to corresponding historical data, such as comparing received earthquake data to historical earthquake data. In yet another example, operation 408 may compare combinations of received data to historical data, such as comparing received earthquake and weather data to historical data. In still another example, operation 408 may compare individual data to historical data using a metric or metrics.

When the comparison of operation 408 indicates a cell alert should be generated, the technique includes an operation 410 to generate a cell alert. For example, operation 410 may include generating a cell alert if a metric, such as a performance indicator or a process control is outside a tolerance range. In an example, operation 410 may include generating a cell alert when the comparison between the received data and the historical data indicates there is an outlier, such as when the comparison indicates a value that exceeds or falls below a threshold for a cell, endpoint, or combination of endpoints. In another example, operation 410 may include generating a cell alert when a trend, a graph, or a set of values indicates, using the comparison, that a cell alert should be generated for a cell, endpoint, or combination of endpoints.

The technique may include an operation 412 to display, transmit, present, or store the cell alert. For example, operation 412 may include displaying the cell alert on a user interface on a display. In another example, operation 412 may include transmitting the cell alert to a remote system. In yet another example, operation 412 may include presenting the cell alert to a user, such as by playing an audible noise. In still another example, operation 412 may include storing the cell alert, such as in a database, or on a local computer, tablet, phone, etc. Combinations of the examples described for operation 412 may also be used, such as storing and transmitting the cell alert. After the cell alert is generated, a system may automatically use the cell alert to modify behavior of one or more endpoints. In another example, after the cell alert is generated, a user may determine an activity to be done based on the cell alert. Other information relevant to a cell alert may be included in the displaying, transmitting, presenting, or storing, of the alert, such as all or part of the received information, the historical data, results of the comparison(s), affected endpoints, nearby endpoints, endpoints in a cell, graphs, trends, options for correction of the alert issue, etc.

When the comparison of operation 408 indicates a cell alert should not be generated, the technique includes an operation 414 to continue to monitor and receive data. For example, operation 414 may include not generating a cell alert if a performance indicator or process control is within a tolerance range. In another example, after an alert is generated in operation 410 or after the cell alert is displayed, transmitted, presented, or stored, the technique 400 may include operation 414. Operation 414 may include iterating technique 400 starting at any of operations 402-408 including skipping one or more operations when appropriate. For example, relevant endpoints may not need to be re-identified or information to be received may not need to be re-determined.

Figure 5:
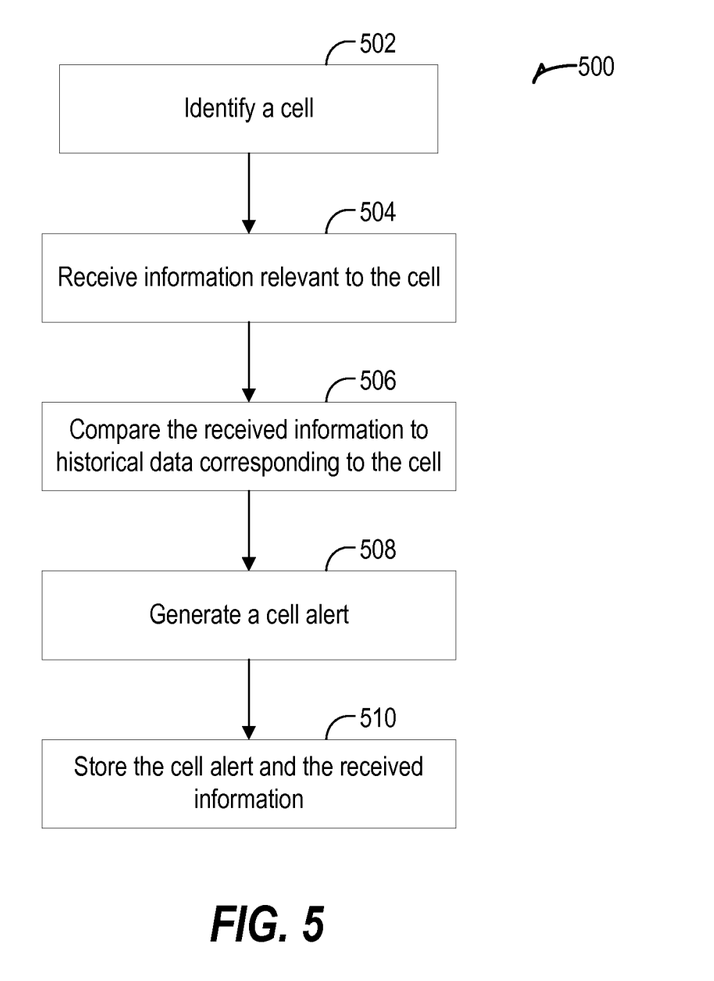
FIG. 5 illustrates generally a flowchart showing a technique for monitoring endpoint devices in accordance with some embodiments.

FIG. 5 illustrates generally a flowchart showing a technique 500 for monitoring endpoint devices in accordance with some embodiments. The technique 500 includes an operation 502 to identify a cell. To identify the cell, the operation 502 may include identifying a plurality of endpoints, such as automatically or with user input. The plurality of endpoints may include 10 to 50 (inclusive) endpoints in an example. In another example, the plurality of endpoints include SSTs.

The technique 500 includes an operation 504 to receive information relevant to the cell, such as geographically relevant received information. The received information may include endpoint location identifying information, social media information, earthquake information, weather information, or the like. The technique 500 includes an operation 506 to compare the received information to historical data corresponding to the cell, such as by using a metric. The metric may include a cash dispense volume, failed customer interactions, servicer service level agreement (SLA) compliance, device security status, technical issues, or service visits. The technique 500 includes an operation 508 to generate a cell alert. The cell alert may be generated when comparing the received information to the historical data identifies an outlier, such as an outlier for a cell, a set of endpoints, or an endpoint of the plurality of endpoints. An outlier may include a value for an endpoint, set of endpoints, cell, or region that exceeds or falls below a threshold or trend line, is outside a specified area (e.g., outside a normal range or outside a normal area of operation based on multiple variables, etc.), or is outside of a standard deviation or multiplier of standard deviations. In an example, an outlier may be user defined. An outlier may be relative to a specific region, cell, or endpoint, or may be absolute. An outlier may be dependent on multiple factors, for example, a metric used to determine if an endpoint is an outlier may rely on a plurality of inputs. In an example, an outlier may include a number of social media interactions that exceeds a threshold. In another example, an outlier may include a value, such as for an endpoint, that is outside of a predetermined range, such as for scheduled servicing activities, servicer SLA compliance, device security status, technical issues, service visits, failed customer interactions cash dispense volume, or the like. When comparing the received information to the historical data does not identify an outlier, a cell alert is not generated.

The technique 500 includes an operation 510 to store the cell alert and the received information. In another example, the technique 500 includes transmitting the cell alert and at least part of the received information for presentation. In an example, storing the cell alert may include storing data about an endpoint of the plurality of endpoints when an outlier is identified by operation 506. The data about the endpoint may include a scheduled servicing activity for the endpoint. The technique 500 may include receiving a user selection indicating a change to the scheduled servicing activity, and in response to receiving the user selection, sending an update indication to a servicer. In another example, the technique 500 may include displaying the cell alert. Displaying the cell alert may include displaying at least part of the received information, such as on a display coupled to a processor. Displaying the cell alert may be done with operation 510 to store the alert or instead of operation 510.

Figure 6:
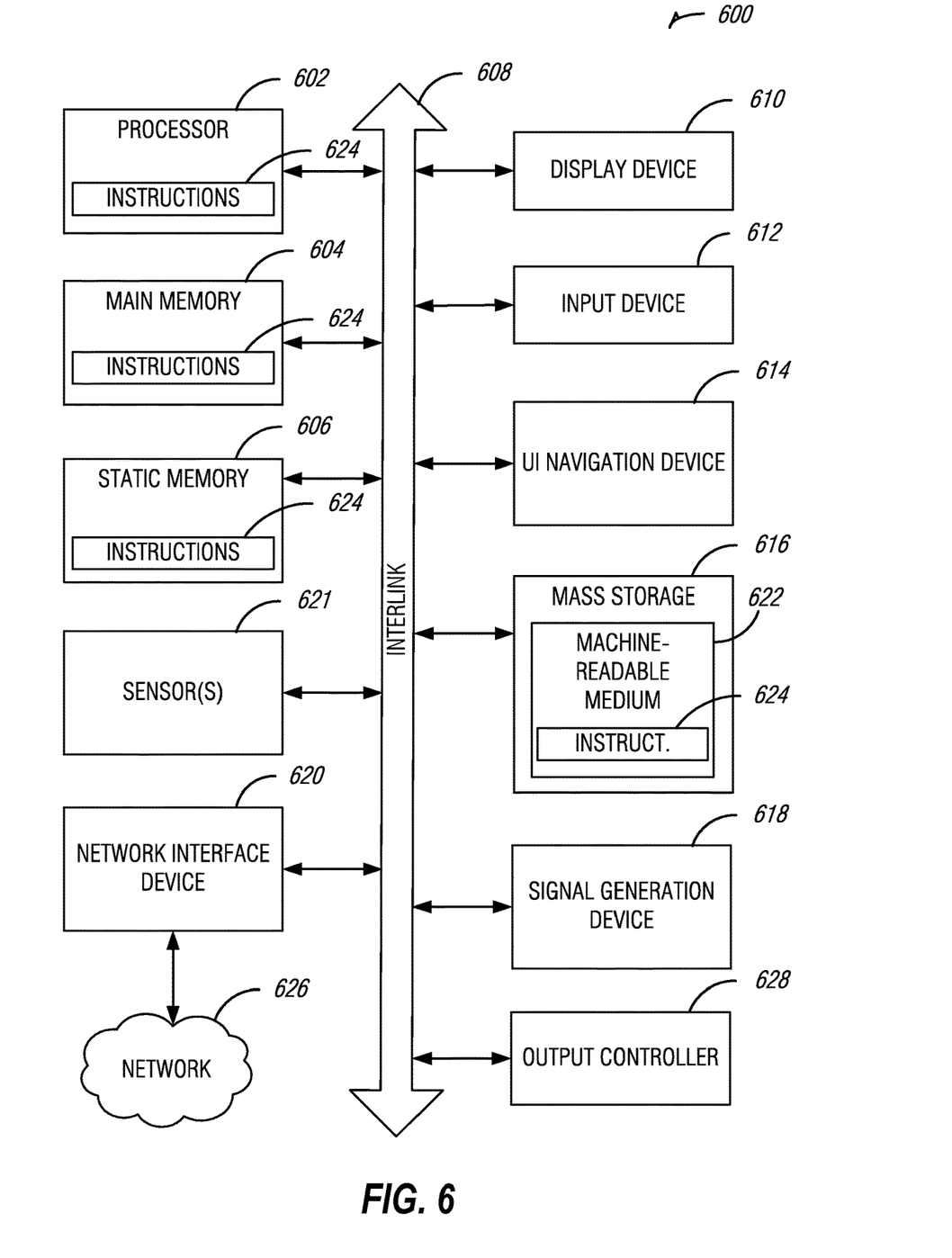
FIG. 6 illustrates generally an example of a block diagram of a machine upon which any one or more of the techniques discussed herein may perform in accordance with some embodiments.

FIG. 6 illustrates generally an example of a block diagram of a machine 600 upon which any one or more of the techniques discussed herein may perform in accordance with some embodiments. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, alphanumeric input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 that is non-transitory on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 includes the subject matter embodied by a method for monitoring endpoint devices, the method comprising: identifying a cell, the cell including a plurality of endpoint devices, receiving information relevant to the cell, comparing the received information, using a metric, to historical data corresponding to the cell, generating a cell alert when comparing the received information to the historical data identifies an outlier, and storing the cell alert and the received information.

In Example 2, the subject matter of Example 1 can optionally include further comprising transmitting the alert and at least part of the received information for presentation.

In Example 3, the subject matter of one or any combination of Examples 1-2 can optionally include wherein the metric includes at least one of cash dispense volume, failed customer interactions, servicer service level agreement (SLA) compliance, device security status, technical issues, and service visits.

In Example 4, the subject matter of one or any combination of Examples 1-3 can optionally include wherein the plurality of endpoint devices of the cell is 10 to 50 endpoint devices, and wherein the plurality of endpoint devices include Self-Service Terminals (SSTs).

In Example 5, the subject matter of one or any combination of Examples 1-4 can optionally include wherein the received information includes information geographically relevant to the cell including at least one of endpoint device location identifying information, social media information, earthquake information, and weather information.

In Example 6, the subject matter of one or any combination of Examples 1-5 can optionally include wherein the received information includes an endpoint device alert, the endpoint device alert corresponding to an endpoint device of the plurality of endpoint devices. plurality of endpoints.

In Example 7, the subject matter of one or any combination of Examples 1-6 can optionally include comparing the received information to the historical data corresponding to the cell includes comparing the endpoint device alert to a network trend.

In Example 8, the subject matter of one or any combination of Examples 1-7 can optionally include storing the cell alert and the received information includes storing data about the endpoint device, and wherein the data about the endpoint device includes a scheduled servicing activity for the endpoint device.

In Example 9, the subject matter of one or any combination of Examples 1-8 can optionally include further comprising receiving a user selection indicating a change to the scheduled servicing activity, and in response to receiving the user selection, sending an update indication to a servicer.

Example 10 includes the subject matter embodied by method for monitoring endpoint devices, the method comprising: identifying a cell, the cell including a plurality of endpoint devices, receiving, using a network interface device, an alert for an endpoint device of the plurality of endpoint devices and information geographically relevant to the cell, wherein the geographically relevant received information includes social media information about an event within an area of the cell, comparing, using a processor, the alert and the received information, using a metric, to historical data corresponding to the cell, generating, using the processor, a cell alert when the comparison identifies an outlier, and displaying the cell alert and at least part of the received information on a display coupled to the processor.

In Example 11, the subject matter of Example 10 can optionally include wherein the metric includes at least one of cash dispense volume, failed customer interactions, servicer service level agreement (SLA) compliance, device security status, technical issues, and service visits.

In Example 12, the subject matter of one or any combination of Examples 10-11 can optionally include wherein the outlier includes a number of social media interactions that exceeds a threshold.

In Example 13, the subject matter of one or any combination of Examples 10-12 can optionally include wherein the geographically relevant received information includes at least one of endpoint device location identifying information, social media information, earthquake information, and weather information.

In Example 14, the subject matter of one or any combination of Examples 10-13 can optionally include wherein the outlier includes a value, for the endpoint device, that is outside of a predetermined range of scheduled servicing activities.

In Example 15, the subject matter of one or any combination of Examples 10-14 can optionally include wherein displaying the cell alert and at least part of the received information includes displaying a scheduled servicing activity for the endpoint device.

In Example 16, the subject matter of one or any combination of Examples 10-15 can optionally include further comprising receiving a user selection indicating a change to the scheduled servicing activity, and in response to receiving the user selection, sending an update indication to a servicer.

Example 17 includes the subject matter embodied by a system for monitoring endpoint devices, the system comprising: one or more processors coupled to a memory device, the memory device containing instructions that, when executed by the one or more processors, cause the system to perform operations comprising: identifying a cell, the cell including a plurality of endpoint devices, receiving an endpoint device alert, for an endpoint device from the plurality of endpoint devices, and information relevant to the cell, comparing the received information, using a metric, to historical data corresponding to the cell, generating a cell alert when comparing the received information to the historical data identifies an outlier, and storing the cell alert and at least part of the received information in a database.

In Example 18, the subject matter of Example 17 can optionally include wherein the metric includes at least one of cash dispense volume, failed customer interactions, servicer service level agreement (SLA) compliance, device security status, technical issues, and service visits.

In Example 19, the subject matter of one or any combination of Examples 17-18 can optionally include wherein the plurality of endpoint devices of the cell is 10 to 50 endpoint devices, and wherein the plurality of endpoint devices include Self-Service Terminals (SSTs).

In Example 20, the subject matter of one or any combination of Examples 17-19 can optionally include wherein the received information includes information geographically relevant to the cell including at least one of endpoint device location identifying information, social media information, earthquake information, and weather information.

Example 21 includes at least one machine-readable medium including instructions for receiving information, which when executed by a machine, cause the machine to perform any of the methods of Examples 1-16.

Example 22 includes an apparatus comprising means for performing any of the methods of Examples 1-16.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method for monitoring endpoint devices, the method comprising:
    identifying a cell, the cell including a plurality of endpoint devices;
    receiving information geographically relevant to the cell, including information about an event within an area of the cell;
    comparing the received information, using a metric, to historical data corresponding to the cell, to determine that a first endpoint device of the plurality of endpoint devices has low cash reserves compared to cash reserve data from a past event similar to the event identified within the area of the cell and that a second endpoint device of the plurality of endpoint devices has higher cash reserves;
    generating a cell alert when comparing the received information to the historical data identifies an outlier, the cell alert indicating cash reserve statuses of the plurality of endpoint devices;
    storing the cell alert and the received information; and
    sending the cell alert to an alert device owner to allow for transfer of cash from the second endpoint device to the first endpoint device.

2. The method of claim 1, further comprising transmitting the cell alert and at least part of the received information for presentation.

3. The method of claim 1, wherein the metric includes at least one of cash dispense volume, failed customer interactions, servicer service level agreement (SLA) compliance, device security status, technical issues, and service visits.

4. The method of claim 1, wherein the plurality of endpoint devices of the cell is 10 to 50 endpoint devices, and wherein the plurality of endpoint devices include Self-Service Terminals (SSTs).

5. The method of claim 1, wherein the received information includes information geographically relevant to the cell including at least one of endpoint device location identifying information, social media information, earthquake information, and weather information.

6. The method of claim 1, wherein the received information includes an endpoint device alert, the endpoint device alert corresponding to an endpoint device of the plurality of endpoint devices.

7. The method of claim 6, wherein comparing the received information to the historical data corresponding to the cell includes comparing the endpoint device alert to a network trend.

8. The method of claim 1, wherein storing the cell alert and the received information includes storing data about the endpoint device, and wherein the data about the endpoint device includes a scheduled servicing activity for the endpoint device.

9. The method of claim 8, further comprising receiving a user selection indicating a change to the scheduled servicing activity, and in response to receiving the user selection, sending an update indication to a servicer.

10. A method for monitoring endpoint devices, the method comprising:
    identifying a cell, the cell including a plurality of endpoint devices;
    receiving, using a network interface device, an alert for an endpoint device of the plurality of endpoint devices and information geographically relevant to the cell, wherein the geographically relevant received information includes social media information about an event within an area of the cell;
    comparing, using a processor, the alert and the received information, using a metric, to historical data corresponding to the cell, to determine that the endpoint device has low cash reserves compared to cash reserve data from a past event similar to the event identified within the social media information and that a second endpoint device of the plurality of endpoint devices has higher cash reserves;
    generating, using the processor, a cell alert when the comparison identifies an outlier, the cell alert indicating cash reserve statuses of the plurality of endpoint devices; and
    displaying the cell alert and at least part of the received information on a display coupled to the processor, the displayed cell alert identifying the endpoint device and the second endpoint device to allow for transfer of cash from the second endpoint device to the endpoint device.

11. The method of claim 10, wherein the metric includes at least one of cash dispense volume, failed customer interactions, servicer service level agreement (SLA) compliance, device security status, technical issues, and service visits.

12. The method of claim 10, wherein the outlier includes a number of social media interactions that exceeds a threshold.

13. The method of claim 10, wherein the geographically relevant received information includes at least one of endpoint device location identifying information, social media information, earthquake information, and weather information.

14. The method of claim 10, wherein the outlier includes a value, for the endpoint device, that is outside of a predetermined range of scheduled servicing activities.

15. The method of claim 14, wherein displaying the cell alert and at least part of the received information includes displaying a scheduled servicing activity for the endpoint device.

16. The method of claim 15, further comprising receiving a user selection indicating a change to the scheduled servicing activity, and in response to receiving the user selection, sending an update indication to a servicer.

17. A system for monitoring endpoint devices, the system comprising:

one or more processors coupled to a memory device, the memory device containing instructions that, when executed by the one or more processors, cause the system to perform operations comprising:

identifying a cell, the cell including a plurality of endpoint devices;

receiving an endpoint device alert, for an endpoint device from the plurality of endpoint devices, and information geographically relevant to the cell, including information about an event within an area of the cell;

comparing the received information, using a metric, to historical data corresponding to the cell, to determine that a first endpoint device of the plurality of endpoint devices has low cash reserves compared to cash reserve data from a past event similar to the event identified within the area of the cell and that a second endpoint device of the plurality of endpoint devices has higher cash reserves;

generating a cell alert when comparing the received information to the historical data identifies an outlier, the cell alert indicating cash reserve statuses of the plurality of endpoint devices;

storing the cell alert and at least part of the received information in a database; and send the cell alert to an alert device owner to allow for transfer of cash from the second endpoint device to the first endpoint device.

18. The system of claim 17, wherein the metric includes at least one of cash dispense volume, failed customer interactions, servicer service level agreement (SLA) compliance, device security status, technical issues, and service visits.

19. The system of claim 17, wherein the plurality of endpoint devices of the cell is 10 to 50 endpoint devices, and wherein the plurality of endpoint devices include Self-Service Terminals (SSTs).

20. The system of claim 17, wherein the received information includes information geographically relevant to the cell including at least one of endpoint device location identifying information, social media information, earthquake information, and weather information.

* * * * *